US012590663B2

(12) United States Patent
    Lobbezoo

(10) Patent No.: US 12,590,663 B2
(45) Date of Patent: Mar. 31, 2026

(54) CLEAN OUT PLUG

(71) Applicant: Thomas Mark Lobbezoo, Caledonia, MI (US)

(72) Inventor: Thomas Mark Lobbezoo, Caledonia, MI (US)

( * ) Notice: Subject to any disclaimer, the term of this patent is extended or adjusted under 35 U.S.C. 154(b) by 446 days.

(21) Appl. No.: 18/222,390

(22) Filed: Jul. 14, 2023

(65) Prior Publication Data

US 2025/0020259 A1    Jan. 16, 2025

(51) Int. Cl.
    *F16K 15/00*        (2006.01)
    *F16L 55/11*        (2006.01)
(52) U.S. Cl.
    CPC .................................. *F16L 55/1108* (2013.01)
(58) Field of Classification Search
    CPC .......................... F16L 55/1108; F16L 55/1141
    See application file for complete search history.

(56) References Cited

U.S. PATENT DOCUMENTS

| | | | | |
|---|---|---|---|---|
| 11,015,755 B1 * | 5/2021 | Apperson | ........... | F16L 55/1108 |
| 2008/0173360 A1 * | 7/2008 | Wander | ............... | F16L 55/1141 |
| | | | | 137/515 |
| 2010/0037969 A1 * | 2/2010 | Fierst | ........................ | F16L 1/11 |
| | | | | 138/104 |
| 2021/0318198 A1 * | 10/2021 | Tash | .................... | F16L 55/1141 |

* cited by examiner

*Primary Examiner* — Amy J. Sterling
(74) *Attorney, Agent, or Firm* — Mitchell Intellectual Property Law, PLLC

(57)                ABSTRACT

A clean out plug for removably plugging a clean out opening in a fluid line has an externally threaded body with an upper surface having an opening into a cavity in the body which houses a reversable key which is removeable from said body, and which has a smooth surface on one side and a tool engaging projection on the reverse side. In a first position in the cavity, the key presents a smooth flush surface with said plug body, with said projection projecting down into said cavity. In its reverse second position said key presents said tool engageable projection projects above said upper surface of said clean out plug body, such that a tool can be used to engage said projection and remove the clean out plug from the opening it plugs.

10 Claims, 5 Drawing Sheets

CLEAN OUT PLUG

BACKGROUND

Cleanout plugs play a vital role in keeping sewerage systems in running condition. They are inserted into and normally close sewer line clean out openings positioned along a sewer line. When inserted and closing the clean out openings, the cleanout plugs prevent wastewater from escaping through the cleanout opening and instead divert it straight through the sewerage line. Plus, they keep dangerous gas fumes from leaking into the home and also functions as a pest controller. When the sewer flow is disrupted, one removes the clean out plug from the sewer line opening and inserts a sewer snake through the opening into the sewer line to unclog it.

The cleanout openings are circular and threaded. The cleanout plugs are correspondingly circular and threaded, so a twist in the right direction can easily turn the cleanout plugs into or out of the clean out opening to seal it or to provide access to facilitate unclogging the sewer line. FIGS. 1 and 2 show two popular styles of prior art cleanout plugs. FIG. 1 shows a "raised head" type plug 1. FIG. 2 shows a "counter sunk type plug 2. The "raised head" cleanout plug 1 has a flat top surface 1*a* except for an upwardly projecting square (or hexagonal) raised head 1*b*. The "counter sunk" clean out plug 2 has a flat top surface 2*a* except for a square counter sunk recess 2*b*. One twists the "raised head" plug 1 in or out by engaging the raised head 1*b* with a wrench and exerts a twisting force with it. One twists the "counter sunk" plug 2 by inserting the end of an Allen type wrench into countersunk recess 2*b* and inserting a twisting force with it.

SUMMARY OF THE INVENTION

The clean out plug of the present invention has an externally threaded body with an upper surface having an opening into a cavity in the body. The cavity houses a key which is removeable from said body. The key has a base with a bottom surface and an upper surface and a projection projecting upwardly form said upper surface of said base. The cavity is configured such that it will house the key in two different positions. In one position, the base is positioned at the top of the cavity, with the bottom surface of the base and the upper surface of the clean out plug body being flush with each other and the projection projecting downwardly into said cavity. In the other position, the base is seated in the cavity with the projection projecting out of the opening in, and beyond the bottom surface of the clean out plug body.

Thus in normal use, the cleanout plug of the present invention presents a flush surface to the clean out plug and to the sewer line in which it is inserted, helping to prevent either projections or recesses on the sewer line which might collect dirt and debris, or create a trip hazard in the floor or which would make it more difficult to remove the clean out plug when necessary. Then when necessary to remove the plug, the key portion of the plug is removed from the cavity and inserted back in its reverse direction, such that the projection is extends upwardly above the upper surface of the clean out plug such that a wrench can be applied to the key projection and used to twist the clean out plug out of its position in the sewer line.

DESCRIPTION OF THE PREFERRED EMBODIMENT

Figure 2:
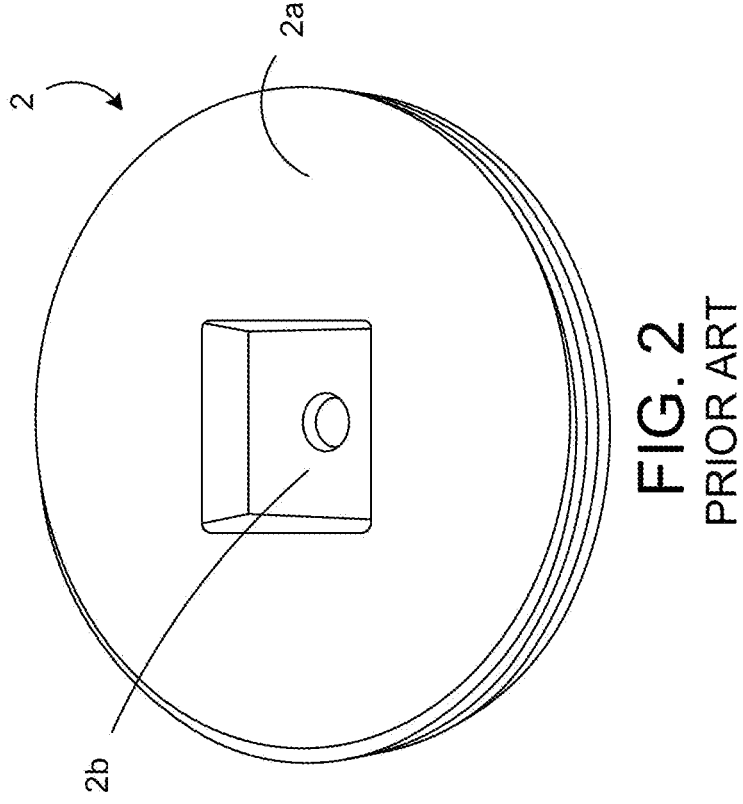
FIG. 2 is a top perspective view of a prior art countersunk type clean out plug.
Figure 1:
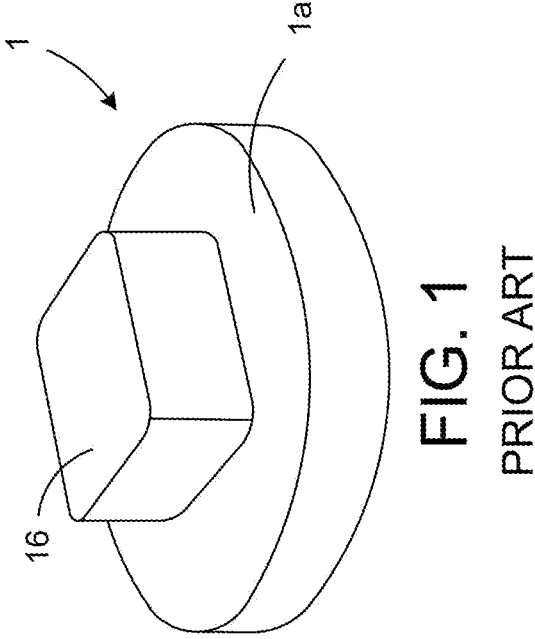
FIG. 1 is a perspective view of a prior art raised head clean out plug.
Figures 3, 4:
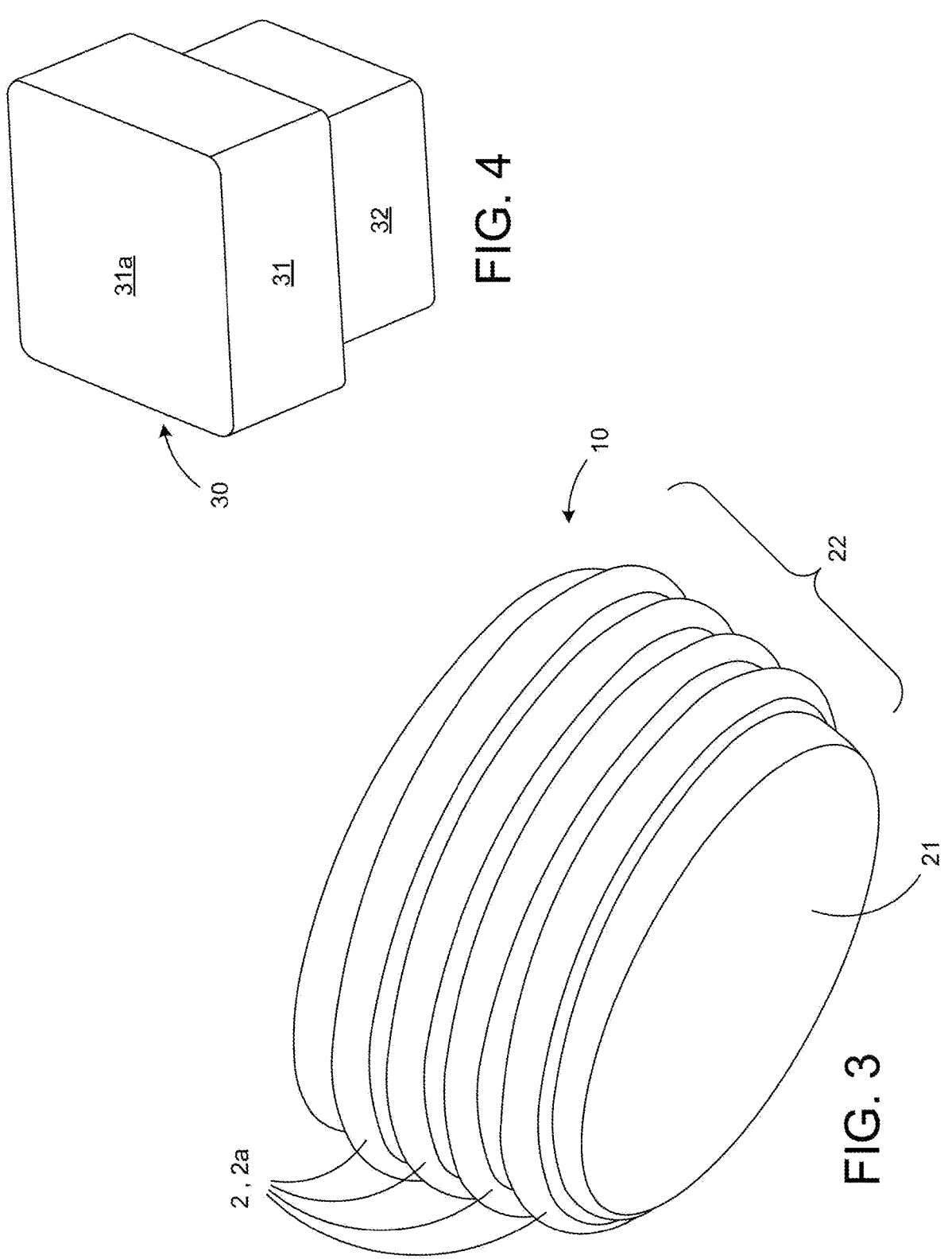
FIG. 3 is a bottom perspective view of clean out plug 10 of the preferred embodiment, showing only the plug body 20.
FIG. 4 is an elevated perspective view of key 30 of clean out plug 10, with base 31 up.
Figures 5, 6:
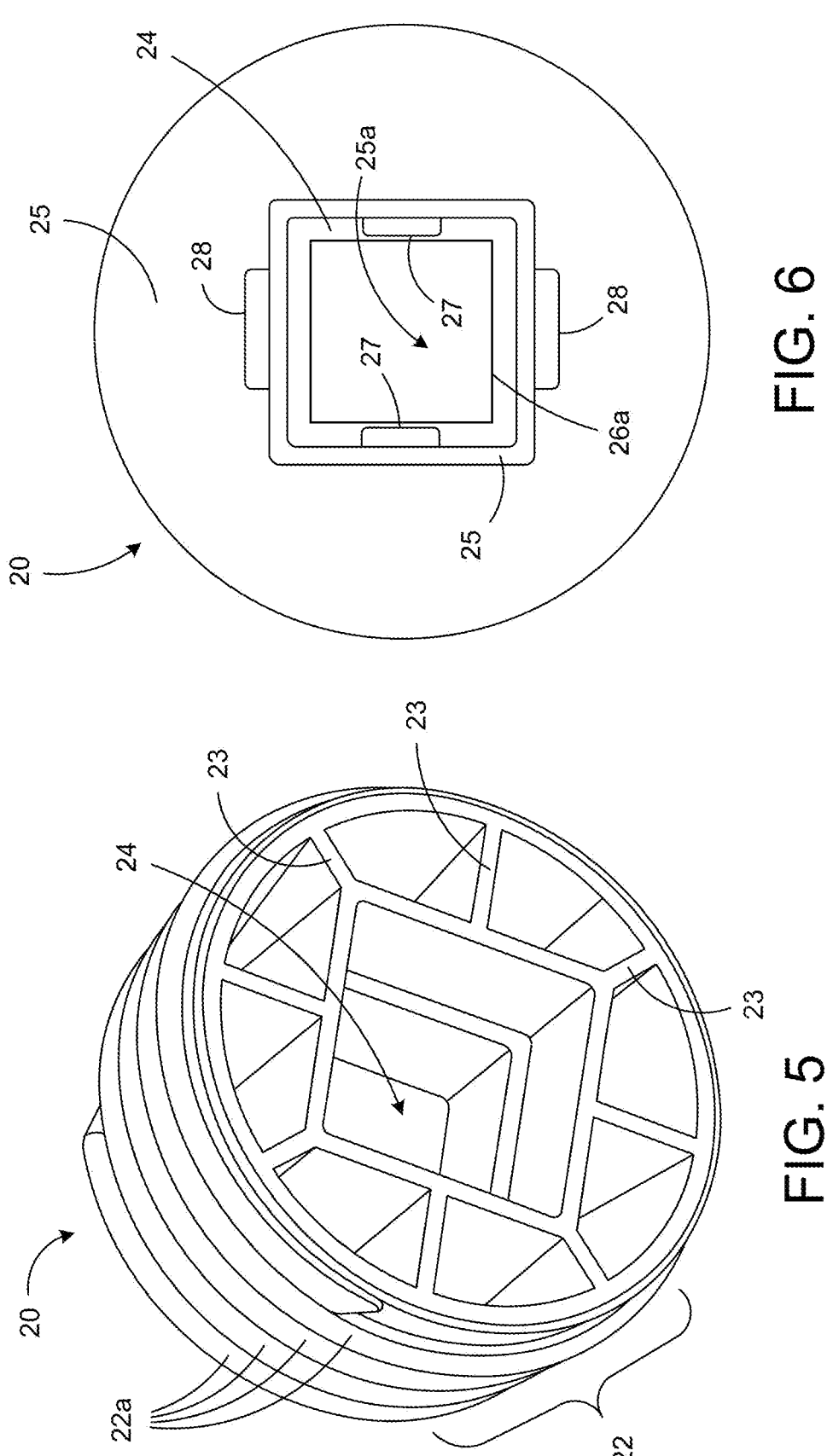
FIG. 5 is a perspective view from the top of plug body 20, with its top plate removed revealing the interior structure of plug body 20.
FIG. 6 is a top view of plug body 20 showing its top surface 25 and its opening 25*a* into the interior of cavity 24.

In the preferred embodiment, clean out plug 10 comprises an externally threaded plug body 20 (FIG. 3) and a separate key 30 (FIG. 4). Plug body 20 has a solid bottom wall 21, a circular side wall 22 which is threaded 22*a* (FIG. 3). The interior of plug body 20 is hollow and is comprised of a plurality of rib walls 23 which extend radially inwardly from the inside of side wall 22 to the wall forming a cavity 24 which extends downwardly from the top wall 25 of plug body 20. As shown in FIG. 6 top view of plug body 20, plug body top wall 25 has an opening providing access down into cavity 24. The rest of plug body top wall 25 is preferably closed and has been removed in FIG. 5 so the viewer can see down into the rest of interior of plug body 20.

It is cavity 24 which normally houses key 30. Cavity 24 is open from its top opening 25*a* in plug body top wall 25 to its bottom. Cavity 24 is circumscribed by a perimeter wall 26, which steps inwardly part of the way down at 26*a* (FIG. 6), thereby defining a larger top cavity portion 24*a* and a smaller bottom cavity portion 24*b* (FIG. 7), with a ledge 26*a*.

Key 30 has a base 31 with a bottom surface 31*a*, and a smaller projection 32 projecting upwardly from the top of base 31 (FIG. 4). Projection 32 is smaller in that it circumscribes a smaller area than base 31. It is important that projection 32 be tall enough that a user can grasp it in the jaws of pliers or wrench and apply a clean out turning force to it. In the preferred embodiment, both base 31 and projection 32 are cubical in configuration. However, they each could have a different configuration, e.g., that of a post, or base 31 and projection 32 could have different configurations from one another. The important related shape considerations for cavity 24 and key 30 are as follows:

1. Top cavity portion 24*a* must be shaped to conform with the shape of base 31 of key 30.
2. Bottom cavity portion must be shaped large enough to completely house projection 32 of key 30, but small enough in area circumscribed that there remains a ledge 26*a* which prevents key base 31 from sinking into bottom cavity portion 24*b* when key base 31 is inserted first into cavity 24.

3. Projection 32 must be tall enough above its connection to base 31 that a user can grasp it in the jaws of a pliers or wrench to turn it when it is projecting upwardly out of cavity 24 when key base 31 is inserted into cavity 24 first.

4. The bottom surface 31*a* key base 31 must be smooth and shaped to conform to and be flush with the upper surface of the clean out plug body 20, and correspondingly to the surface of the sewer line in which the clean out plug 10 it is inserted, helping to prevent either projections or recesses on plug body 20 which might collect dirt and debris, or create a trip hazard in the floor, and/or which would make it more difficult to remove the clean out plug when necessary.

Figures 7, 8:
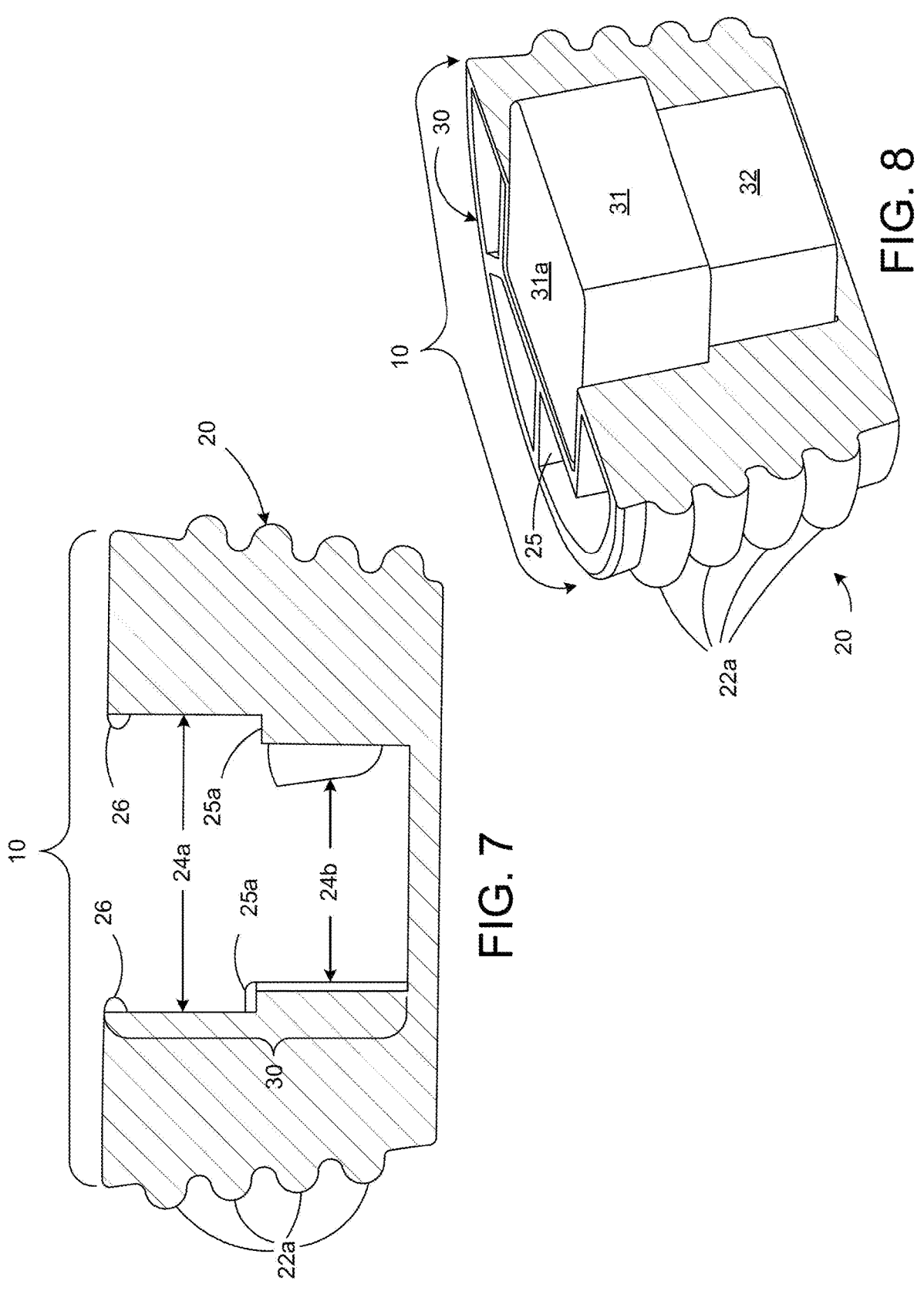
FIG. 7 is a cross sectional vies of plug body 20 without a key 30 in cavity 24.
FIG. 8 is a perspective cross sectional view of clean out plug 10, including plug body 20 with key 30 inserted therein with base 31 up and projection 23 down.

The sidewalls of upper cavity portion 24*a* have one or two inwardly projection detents 27 which are just large enough that key base 31 can be readily forced past them when inserted into upper cavity 24*a*, but the interfere sufficiently with base 31 that it will not readily fall out of cavity 24 (FIGS. 6, 7). Top surface 25 of plug body 20 has slots 28 on either side of key opening 25*a*, which extend down into plug body sufficiently that a flat blade screwdriver or forceps can be inserted into them and used to pry key base 31 out past detents 27 such that key 30 can be entirely removed from cavity 24. (FIG. 6)

Figures 9, 10:
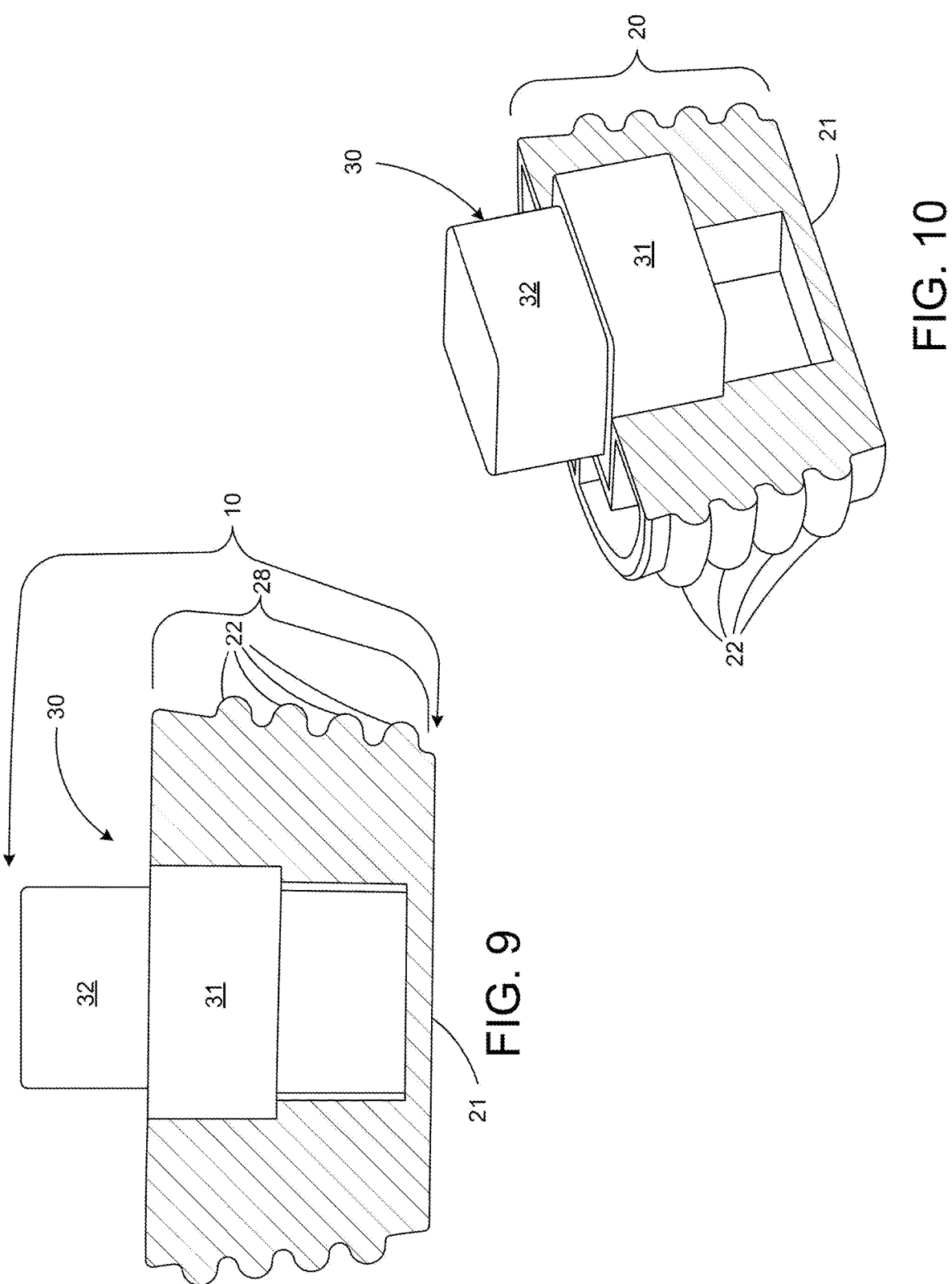
FIG. 9 is a cross sectional view of clean out plug 10 including plug body 20 with key 30 located therein with base 31 down and projection 32 up, extending above plug body 20.
FIG. 10 is a perspective cross sectional view of clean out plug 10 including plug body 20 with key 30 located therein with base 31 down and projection 32 up, extending above plug body 20.

In normal operation, base 31 of key 30 is positioned in upper portion 24*a* of cavity 24 with bottom surface 31*a* flush with upper surface 25 of clean out plug body 20 being, and projection 32 projecting downwardly into lower cavity portion 24*b* (FIG. 8). When it is necessary to clean out the sewer or drain line, the user inserts a forceps or flat blade into one or both slots 28 and pry's key 30 out of cavity 24, reverses it and places base 31 into upper cavity 24*a* with projection 32 projecting upwardly past top surface 25*a* of plug body 20 and above the surface of the sewer or drain line such that a removal tool can be applied to projection 32 and used to remove clean out plug 10 from sewer or drain line access hole. In the preferred embodiment, the removal tool would be a wrench which could be used to turn clean out plug 10 on its threads until it is removed from the clean out access hole in said sewer or drain line such that the line can be cleaned out. (FIGS. 9, 10).

Thus, in normal use, the cleanout plug 10 presents a flush surface to the clean out plug 10 and to the sewer line in which it is inserted, helping to prevent either projections or recesses on the sewer line which might collect dirt and debris, or create a trip hazard in the floor, and/or which would make it more difficult to remove the clean out plug when necessary. Yet, when necessary, the key 30 of plug 10 is removed from the cavity 24 and inserted back in its reverse direction, such that the projection 32 extends upwardly above the upper surface 25 of the clean out plug such that a wrench can be applied to it and used to twist the clean out plug out of its position in the sewer line.

The invention claimed is:

1. A clean out plug for removably plugging a clean out access opening to a fluid carrying line such as a sewer line or the like comprising: clean out plug body and a reversable key being orientable in reverse first and second positions; said clean out plug body having an upper surface with an upwardly opening key housing cavity therein presenting a top opening in said cavity; said cavity having a bottom; said cavity being configured to removably and reversibly house said reversable key in both its first and second reverse positions; said reversable key having a smooth bottom surface and an upper surface having a tool engageable projection projecting upwardly from said upper surface; said cavity being configured to house said reversable key said first position with said smooth bottom surface at said top opening of said cavity and presenting a flush surface with said key upper surface of said clean out plug body; and said cavity also being configured to house said key in its said second position with said upper surface of said key at said top opening of said cavity, with said tool engageable projection projecting above said upper surface of said clean out plug body, whereby in said first position said key presents a flush surface with said clean out plug body thus helping to prevent either projections or recesses which might collect dirt and debris, or create a trip hazard in the floor, and/or and make removal of said key form said plug body and removal of said clean out plug from said access opening in said fluid carrying line more difficult, and in said second position provide said upwardly projecting tool engaging projection such that a clean out plug removal tool can be applied to said projection and used to remove said clean out plug from said access opening in said fluid carrying line.

2. The clean out plug of claim 1 in which said key housing cavity is open from its said top opening to its said bottom; said cavity being circumscribed by a perimeter wall which steps inwardly at part of the way down said cavity toward said cavity bottom, thereby defining a larger top cavity portion and a smaller bottom cavity portion below said ledge.

3. The clean out plug of claim 2 in which said key has a base which has said smooth bottom surface of said key, and a top, which comprises said upper surface of said key, and which has said projection projecting upwardly from said top of said base; said projection circumscribing a smaller area than base; said projection being sufficiently tall that when said key is seated in said cavity in its second position with said tool engageable projection projecting above said upper surface of said clean out plug body, one can grasp it with said clean out plug removal tool and remove said clean out plug from said fluid line access hole.

4. The clean out plug of claim 3 in which: said larger top cavity portion is shaped to conform with the shape of said base of said key; said smaller bottom cavity portion is shaped large enough to completely house said key projection, but small enough in area circumscribed that there remains said ledge which prevents said key base from sinking into said smaller bottom cavity portion when said key base is inserted first into said key housing cavity.

5. The clean out plug of claim 4 in which said clean out plug body is threaded to match a threaded clean out opening in said fluid carrying line, such that removal of said clean out plug from said fluid carrying line access opening can be accomplished by twisting a removal tool.

6. The clean out plug of claim 5 in which said upper cavity portion has sidewalls having at least one inwardly projecting detent which is just large enough that said key base can be readily forced past said detent when inserted into said upper cavity, but interferes sufficiently with removal of said base that said key will not readily fall out of cavity said once inserted into it.

7. The clean out plug of claim 6 in which said top surface of said plug body has slots 28 on either side of key opening which extend down into said plug body sufficiently that a prying tool can be inserted into said slots and used to pry said key base out past said at least one detent such that said key can be entirely removed from key housing cavity.

8. The clean out plug of claim 1 in which said clean out plug body is threaded to match a threaded clean out opening in said fluid carrying line, such that removal of said clean out plug from said fluid carrying line access opening can be accomplished by twisting a removal tool.

9. A method of removably plugging a clean out access opening in a fluid carrying line such as a sewer line or the like comprising; providing a clean out plug having a plug body and a reversable key being orientable in reverse first and second positions; said clean out plug body having an upper surface with an upwardly opening key housing cavity therein presenting a top opening in said cavity; said cavity having a bottom; said cavity being configured to removably and reversibly house said reversable key in both its first and second reverse positions; said reversable key having a smooth bottom surface and an upper surface having a tool engageable projection projecting upwardly from said upper surface; said cavity being configured to house said reversable key said first position with said smooth bottom surface at said top opening of said cavity and presenting a flush surface with said key upper surface of said clean out plug body; and said cavity also being configured to house said key in its said second position with said upper surface of said key at said top opening of said cavity, with said tool engageable projection projecting above said upper surface of said clean out plug body, whereby in said first position said key presents a flush surface with said clean out plug body thus helping to prevent either projections or recesses which might collect dirt and debris, or create a trip hazard in the floor, and/or and make removal of said key form said plug body and removal of said clean out plug from said access opening in said fluid carrying line more difficult, and in said second position provide said upwardly projecting tool engaging projection such that a clean out plug removal tool can be applied to said projection and used to remove said clean out plug from said access opening in said fluid carrying line; in normal use, maintaining said cleanout plug in said clean out access opening in said first position which presents a flush surface to said clean out plug and to said fluid carrying line in which it is inserted, helping to prevent either projections or recesses on the sewer line which might collect dirt and debris, or create a trip hazard in the floor, and/or which would make it more difficult to remove the clean out plug when necessary, and removing said key from said key housing cavity and inserting back in its reverse direction, such that said projection extends upwardly above said upper surface of said clean out plug, and applying a removal tool to said projection and removing said clean out plug from said access opening such that said fluid carrying line can be cleaned.

10. The clean out plug of the present invention has an externally threaded body with an upper surface having an opening into a cavity in the body; the cavity houses a key which is removeable from said body; the key has a base with a bottom surface and an upper surface and a projection projecting upwardly form said upper surface of said base; the cavity is configured such that it will house the key in two different positions; in one position, the base is positioned at the top of the cavity, with the bottom surface of the base and the upper surface of the clean out plug body being flush with each other and the projection projecting downwardly into said cavity; in the other position, the base is seated in the cavity with the projection projecting out of the opening in, and beyond the bottom surface of the clean out plug body;

said clean out plug being reversibly configured to present a flush surface when inserted into said clean out access opening in a first orientation, and to present a tool engaging projection when inserted into said clean out access opening in a second orientation fluid line in which it is inserted, helping to prevent either projections or recesses on the sewer line which might collect dirt and debris, or create a trip hazard in the floor, and/or which would make it more difficult to remove the clean out plug when necessary; then when necessary to remove the plug, the key portion of the plug is removed from the cavity and inserted back in its reverse direction, such that the projection is extends upwardly above the upper surface of the clean out plug such that a wrench can be applied to the key projection and used to twist the clean out plug out of its position in the sewer line;

thus in normal use, the cleanout plug of the present invention presents a flush surface to the clean out plug and to the sewer line in which it is inserted, helping to prevent either projections or recesses on the sewer line which might collect dirt and debris, or create a trip hazard in the floor, and/or which would make it more difficult to remove the clean out plug when necessary; then when necessary to remove the plug, the key portion of the plug is removed from the cavity and inserted back in its reverse direction, such that the projection is extends upwardly above the upper surface of the clean out plug such that a wrench can be applied to the key projection and used to twist the clean out plug out of its position in the sewer line.

\* \* \* \* \*